(12) United States Patent
El-Refaie et al.

(10) Patent No.: US 8,633,627 B2
(45) Date of Patent: Jan. 21, 2014

(54) ELECTRIC MACHINE

(75) Inventors: Ayman Mohamed Fawzi El-Refaie, Niskayuna, NY (US); James Pellegrino Alexander, Niskayuna, NY (US); Patel Bhageerath Reddy, Schenectady, NY (US); Manoj Ramprasad Shah, Latham, NY (US)

(73) Assignee: General Electric Company, Niskayuna, NY (US)

( * ) Notice: Subject to any disclaimer, the term of this patent is extended or adjusted under 35 U.S.C. 154(b) by 100 days.

(21) Appl. No.: 13/220,848

(22) Filed: Aug. 30, 2011

(65) Prior Publication Data
US 2013/0049513 A1 Feb. 28, 2013

(51) Int. Cl.
*H02K 21/12* (2006.01)

(52) U.S. Cl.
USPC ............... 310/156.01; 310/162; 310/156.53

(58) Field of Classification Search
USPC ........... 310/156.01, 156.36, 156.43, 156.53, 310/156.56, 162, 179
See application file for complete search history.

(56) References Cited

U.S. PATENT DOCUMENTS

| | | | | |
|---|---|---|---|---|
| 5,886,440 | A * | 3/1999 | Hasebe et al. | 310/156.19 |
| 6,441,523 | B1 * | 8/2002 | Koharagi et al. | 310/156.28 |
| 6,940,199 | B2 * | 9/2005 | Imamura et al. | 310/156.48 |
| 7,564,158 | B2 * | 7/2009 | Huth et al. | 310/166 |
| 7,777,382 | B2 * | 8/2010 | Aota et al. | 310/156.53 |
| 2003/0030343 | A1 * | 2/2003 | Naito et al. | 310/156.56 |
| 2006/0061226 | A1 * | 3/2006 | Kim et al. | 310/156.43 |
| 2006/0103251 | A1 * | 5/2006 | Taniguchi et al. | 310/156.01 |
| 2006/0145556 | A1 * | 7/2006 | Aota et al. | 310/156.53 |
| 2008/0143207 | A1 * | 6/2008 | Shah et al. | 310/156.08 |
| 2008/0157622 | A1 * | 7/2008 | Shah et al. | 310/184 |
| 2010/0133939 | A1 * | 6/2010 | Takemoto et al. | 310/156.43 |
| 2011/0031840 | A1 | 2/2011 | Huth et al. | |
| 2011/0241466 | A1 * | 10/2011 | Takahashi et al. | 310/156.01 |

FOREIGN PATENT DOCUMENTS

WO 2008028996 A1 3/2008

OTHER PUBLICATIONS

Arahal et al., "Stability Analysis of Five-Phase Induction Motor Drives with Variable Third Harmonic Injection", Electric Power Systems Research, vol. 80, Issue 12, pp. 1459-1468, Dec. 2010.

* cited by examiner

*Primary Examiner* — Tran Nguyen
*Assistant Examiner* — Naishadh Desai
(74) *Attorney, Agent, or Firm* — Jason K. Klindtworth

(57) ABSTRACT

A permanent magnet machine includes a stator having a stator core, a plurality of stator teeth and plurality of stator windings coupled to the stator core. The stator is configured to generate a stator magnetic rotating field when the stator windings are excited with an electric current. The stator magnetic rotating field includes both synchronous sub-harmonic and super-harmonic components. The permanent magnet machine also includes a rotor that is disposed within the stator. The rotor includes a rotor core and a plurality of rotor magnets that are coupled to the rotor core. The rotor magnets are further configured to have a predefined orientation profile such that when the stator windings are excited with an electric current, sub-harmonic and super-harmonic magnetic rotating fields are generated in the rotor magnetic field. The stator sub-harmonic and super-harmonic magnetic rotating fields interact with the rotor sub-harmonic and super-harmonic magnetic rotating fields and produce an aiding torque on in the permanent magnet machine.

19 Claims, 7 Drawing Sheets

ELECTRIC MACHINE

STATEMENT REGARDING FEDERALLY SPONSORED RESEARCH & DEVELOPMENT

This invention was made with Government support under contract number DE-FC26-07NT43122 awarded by the U.S. Dept. of Energy. The Government has certain rights in the invention

BACKGROUND

Embodiments presented herein relate generally to electric machines, and more particularly, to a permanent magnet machine having a plurality of fractional-slot concentrated windings where each coil is wound around a single stator tooth.

Electric machines, for example, permanent magnet machines with fractional-slot concentrated windings generally include a stator with a core that is provided with a plurality of slots. A plurality of windings is wound around the slots of the stator. A rotor is disposed within the stator and includes a plurality of permanent magnets. The machine operation typically includes injecting current to the stator windings that would subsequently generate a torque in the rotor.

One advantage of such a machine is the generation of a smooth torque. Another advantage of the electric machine is a higher fault-tolerant capability, allowing the machine to work even in faulty conditions. When the stator windings are excited, a magnetic field is induced around the stator. This magnetic field generates a high content of magneto motive force (MMF) harmonics. When the machine is in operation, the magnetic field induced around the stator with the high MMF harmonics interacts with the magnetic field around the rotor. The presence of stator MMF harmonics may generate unbalanced forces and torque ripples, resulting in losses in the machine.

There is a need for an improved electric machine.

BRIEF DESCRIPTION

In accordance with an embodiment of the invention, a permanent magnet machine is provided. The permanent magnet machine includes a stator having a stator core, a plurality of stator teeth and plurality of stator windings coupled to the stator core. The stator is configured to generate a stator magnetic rotating field when the stator windings are excited with an electric current that includes a synchronous harmonic component and a sub-harmonic component. The stator magnetic rotating field includes both synchronous sub-harmonic and super-harmonic components. The permanent magnet machine also includes a rotor that is disposed within the stator. The rotor includes a rotor core and a plurality of rotor magnets that are coupled to the rotor core. The rotor magnets are further configured to have a predefined orientation profile such that when the stator windings are excited with an electric current including a synchronous harmonic component and a sub-harmonic component, sub-harmonic and super-harmonic magnetic rotating fields are generated in the rotor magnetic field. The stator sub-harmonic and super-harmonic magnetic rotating fields interact with the rotor sub-harmonic and super-harmonic magnetic rotating fields and produce an aiding torque on in the permanent magnet machine.

According to another embodiment of the invention, a method for operating a permanent magnet machine is provided. The method includes supplying electric power in a predetermined phase sequence to the plurality of stator windings of the permanent magnet machine so as to generate stator sub-harmonic and super-harmonic magnetic rotating fields via the stator. The electric current in a predetermined phase sequence is also used to generate rotor sub-harmonic and super-harmonic magnetic rotating fields via the rotor. The stator sub-harmonic and super-harmonic magnetic rotating fields and the rotor sub-harmonic and super-harmonic magnetic rotating fields interact with each other to induce an aiding torque on the rotor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention are directed towards a permanent magnet machine and a method for operating the same. In accordance with an embodiment of the invention, a permanent magnet machine is provided. The permanent magnet machine includes a stator with a stator core, stator teeth and plurality of stator windings coupled to the stator core. The stator is configured to generate a stator magnetic field when the stator windings are excited with a polyphase electric current. The permanent magnet machine also includes a rotor that is disposed within a cavity inside the stator. The rotor includes a rotor core and a plurality of rotor magnets that are coupled to the rotor core. The rotor magnets are configured to generate a rotor magnetic field that would interact with the stator magnetic field to produce a torque. The rotor magnets have a predefined orientation profile such that when the stator windings are excited with a polyphase current, sub-harmonic and super-harmonic magnetic rotating fields are generated in the stator and rotor magnetic fields. The polyphase current includes a synchronous harmonic component and a sub-harmonic component. The stator sub-harmonic and super-harmonic magnetic rotating fields and the rotor sub-harmonic and super-harmonic magnetic rotating fields interact with each other to produce an aiding torque on the rotor. The aiding torque also acts to cancel the torque retarding effects of the sub-harmonic and super-harmonic magnetic rotating fields of the stator's magnetic field.

Figure 1:
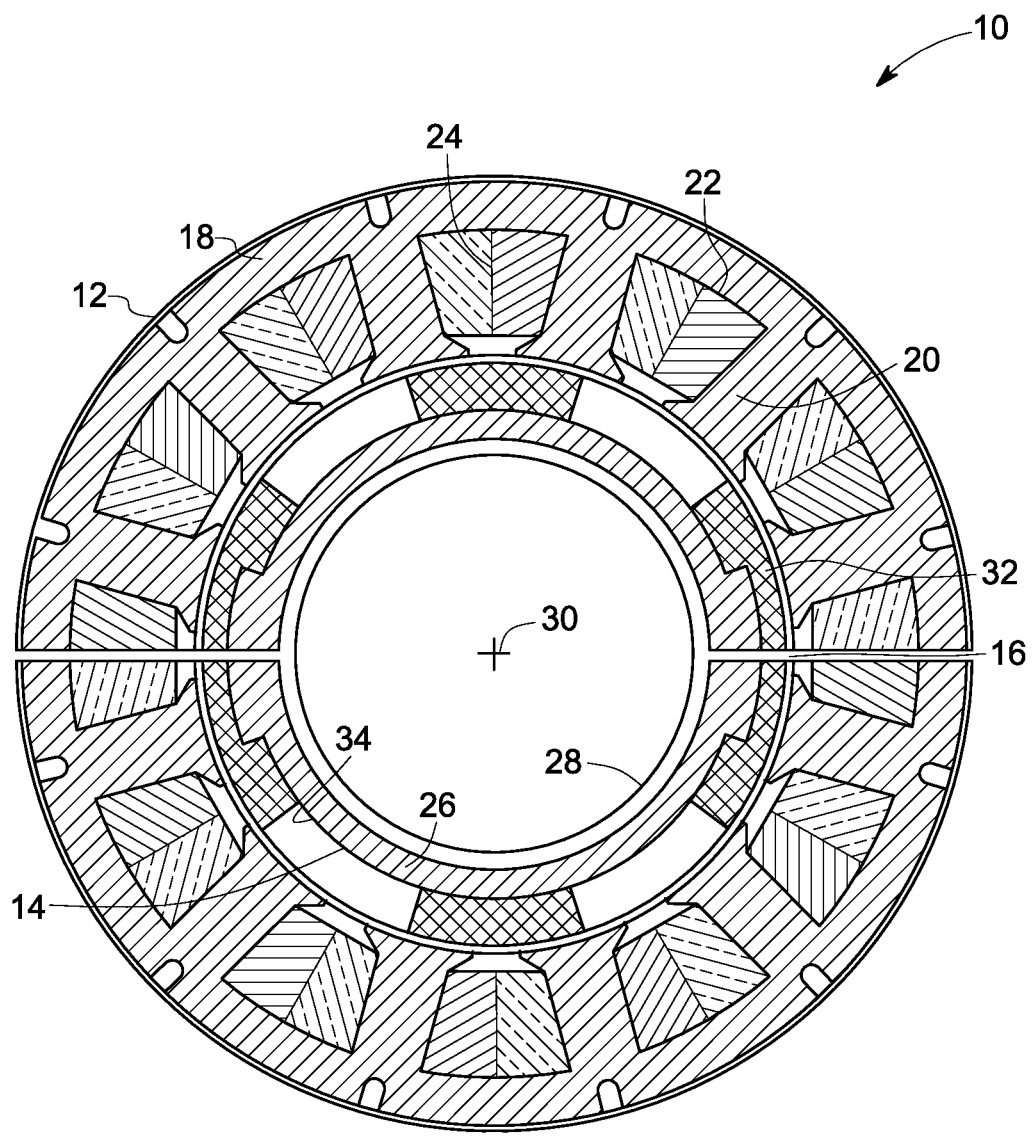
FIG. 1 is a cross-sectional view of a permanent magnet machine having an exemplary rotor magnet arrangement in accordance with an exemplary embodiment of the present invention.

FIG. 1 illustrates a cross-sectional view of a permanent magnet machine 10 having a stator 12 and a rotor 14 disposed internally within a cavity 16 inside the stator 12. In the illustrated embodiment, the permanent magnet machine 10 includes a fractional slot concentrated permanent magnet machine. The stator 12 further includes a stator core 18 having stator teeth 20 and a plurality of stator slots 22. The stator core 18 further includes a plurality of stator windings 24 that are wound around the stator teeth 20. In one embodiment, the plurality of stator windings 24 include, copper coils.

In this illustrated embodiment, the rotor 14 includes a rotor core 26 and a rotor shaft 28 that rotates about an axis 30. The rotor core 26 also includes a plurality of rotor magnets 32 arranged along an outer circumference 34 of the rotor core 26. In a further embodiment, the rotor magnets 32 have a predefined orientation profile and are arranged along the outer circumference 34 of the rotor core 26. The orientation profiles of the rotor magnets 32 are discussed in greater detail with reference to subsequent figures below. The rotor magnets 32 are configured to produce a magnetic field in an air gap between the stator 12 and the rotor 14.

In a specific embodiment of the invention, the permanent magnet machine 10 is actuated by supplying a polyphase electric current to the plurality of stator windings 24 coupled to the stator core 18. As known to one skilled in the art, in a fractional slot concentrated winding machine, the number of stator slots 22 is not equal to the number of rotor magnets 32.

In accordance with one embodiment, when the plurality of stator windings 24 are excited by a polyphase electric current, a magnetic field is generated around the stator 12. The magnetic field around the stator 12 induces a synchronous torque in the rotor 14. During normal operation of the permanent magnet machine 10, the rotor magnets 32 lock-in with the rotating field caused by the synchronous torque and the permanent magnet machine is said to be in synchronization.

According to one embodiment of the invention, the plurality of stator windings 24 are excited with a polyphase electric current including both a synchronous harmonic component and sub-harmonic component. As a result of this excitation, the magnetic field generated around the stator 12 includes sub-harmonic and super-harmonic magnetic rotating fields. Due to the presence of these sub-harmonic and super-harmonic magnetic rotating fields in the stator's magnetic field, certain rotating magnetic fields that are not synchronous with the rotor's normal rotating magnetic field are produced. These sub-harmonic and super-harmonic magnetic rotating fields in the stator's magnetic field cause vibrational and electromagnetic losses during operation of the permanent magnet machine 10. In accordance with the embodiments of the present invention, a magnetic field is generated in the air gap between the stator 12 and the rotor 14 due to the presence of the rotor magnets 32 having a predefined orientation profile that are arranged along the circumference 34 of the rotor core 26. Sub-harmonic and super-harmonic magnetic rotating fields are generated in the rotor's magnetic field due to the predefined orientation profile of the rotor magnets 32. These sub-harmonic and super-harmonic magnetic rotating fields that are generated in the rotor's magnetic field act to cancel the effect of the sub-harmonic and super-harmonic magnetic rotating fields that exist in the stator's magnetic field. During operation of the permanent magnet machine 10, the interaction of the sub-harmonic and super-harmonic magnetic rotating fields of the stator's magnetic field with the sub-harmonic and super-harmonic magnetic rotating fields of the rotor's magnetic field, produces a torque in addition to the synchronous torque produced in the permanent magnet machine 10. This additional torque acts as an "aiding torque" and increases the efficiency and speed of the permanent magnet machine 10. The additional torque also acts to cancel the torque retarding effects of the sub-harmonic and super-harmonic magnetic rotating fields of the stator's magnetic field.

Figure 2:
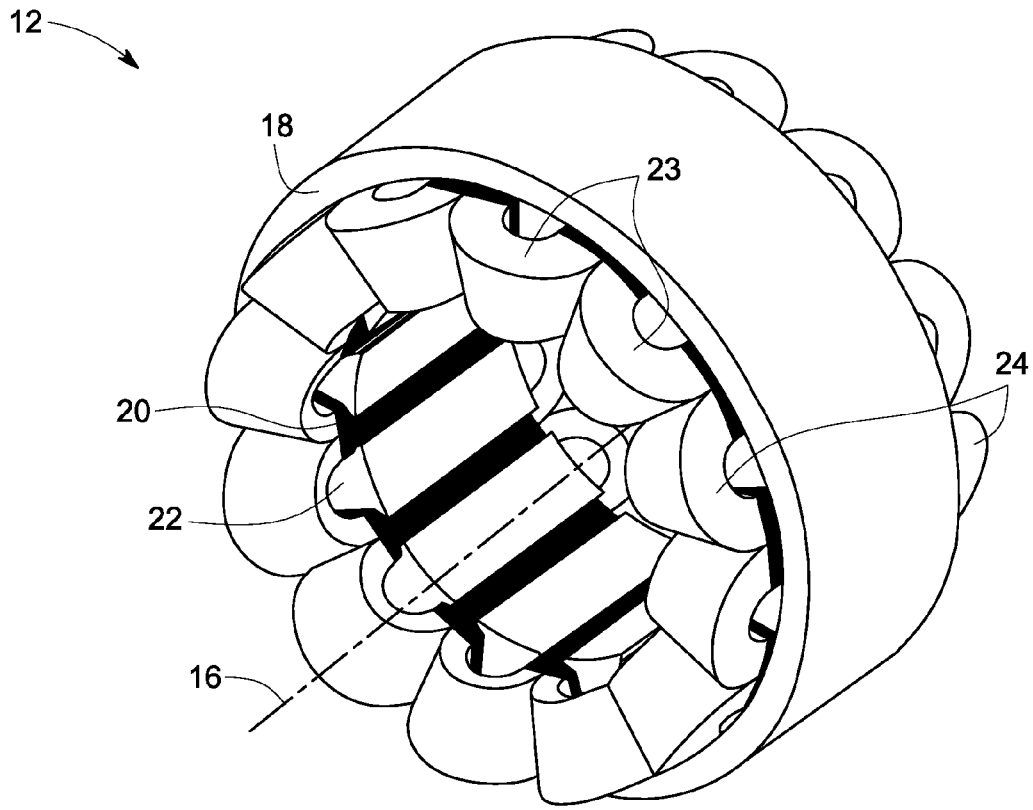
FIG. 2 is a three-dimensional view of a stator in a permanent magnet machine in accordance with an exemplary embodiment of the present invention.

FIG. 2 illustrates a three dimensional view of the stator 12. As discussed previously, the stator 12 includes the stator core 18 having the stator teeth 20 and the plurality of stator slots 22. The stator core 18 further includes the plurality of stator windings 24 that are wound around the stator teeth 20. In the illustrated embodiment, the plurality of stator windings 24 include a plurality of coils 23, where each coil 23 is wound around a corresponding tooth among the stator teeth 20.

Figure 3:
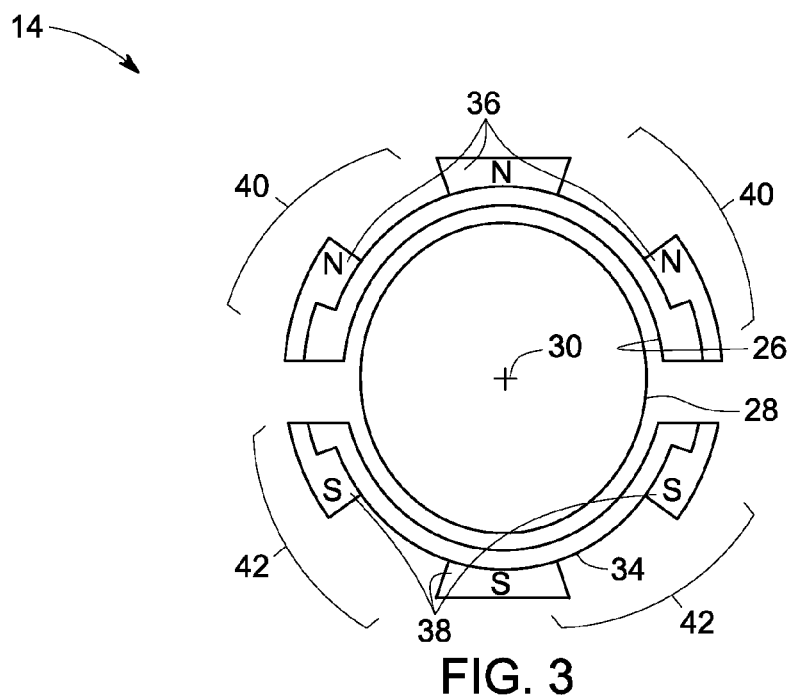
FIG. 3 is a cross-sectional view of a rotor having an exemplary rotor magnet arrangement in accordance with an exemplary embodiment of the present invention.

FIG. 3 illustrates a cross-sectional view of the rotor 14 having a plurality of rotor magnets 32 with a predefined orientation profile. In the illustrated embodiment, the circumference 34 of the rotor core 26 has one half portion 40 and another half portion 42. The rotor magnets 32 are arranged along the circumference 34 of the rotor core 26 in such a way that the magnets of one polarity 36 are arranged along one half 40 of the circumference 34 of the rotor core 26 and the rotor magnets 32 of opposite polarity 38 are arranged along the other half 42 of the circumference 34. The one half 40, for example, extends between 0 degrees and 180 degrees along the circumference 34 of the rotor core 26. The other half 42, for example, extends between 180 degrees and 360 degrees along the circumference 34 of the rotor core 26. In one embodiment, magnets 32 of north polarity are arranged along one half 40 of the circumference 34 of the rotor core 26 and the rotor magnets 32 of south polarity are arranged along the other half 42 of the circumference 34. In another embodiment, magnets 32 are arranged vice versa in polarity.

Figure 4:
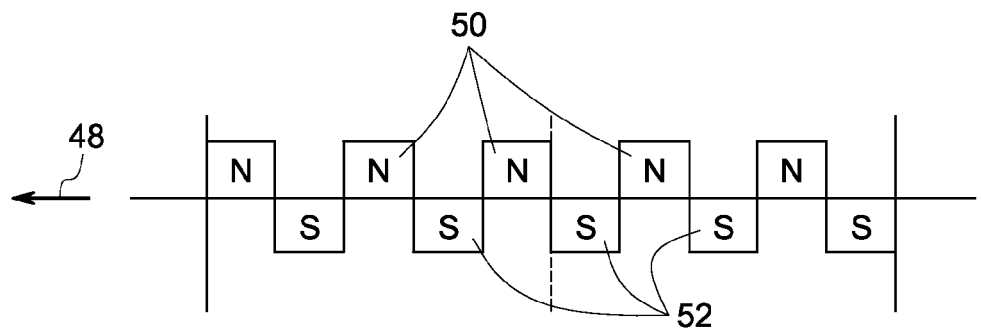
FIG. 4 is a diagrammatical representation of a conventional ten-pole rotor magnet arrangement.

FIG. 4 is a diagrammatical representation of a conventional ten-pole rotor arrangement 48. The ten-pole rotor arrangement 48 with a plurality of rotor magnets 50 of north polarity and a plurality of rotor magnets 52 of south polarity arranged alternately along a circumference of the rotor core. Specifically, in the shown conventional arrangement, three rotor magnets 50 of north polarity and two magnets 52 of south polarity are arranged alternately along either halves of the rotor core. As a result of such a rotor magnet arrangement 48, certain harmonic magnetic rotating fields are generated in the rotor's magnetic field. The harmonic magnetic fields generated by this rotor magnet arrangement 48 cannot act to cancel the torque retarding effects of the sub-harmonic and super-harmonic magnetic rotating fields that exist in the stator magnetic field when the plurality of stator windings are excited with a polyphase current. The harmonic magnetic fields generated by this rotor magnet arrangement 48, lack a specific harmonic that can cancel the sub-harmonic and super-harmonic magnetic rotating fields that exist in the stator magnetic field.

Figure 5:
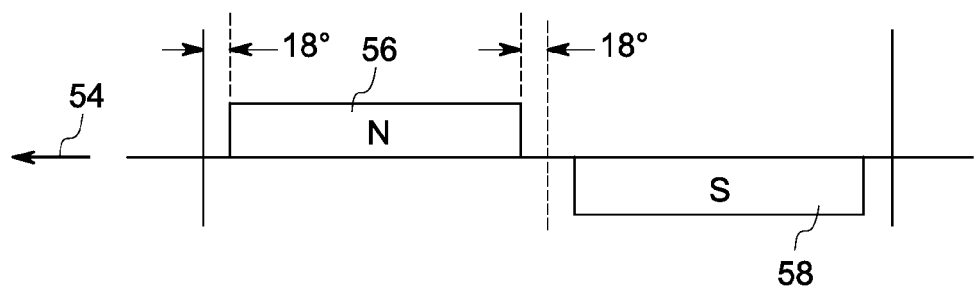
FIG. 5 is diagrammatical representation of a two-pole rotor magnet arrangement in accordance with an exemplary embodiment of the present invention.

FIG. 5 is a diagrammatical representation of a two-pole rotor arrangement 54 in accordance with an exemplary embodiment of the present invention. The 2 pole rotor arrangement 544includes one rotor magnet 56 of north polarity arranged along one half of the circumference of the rotor core and another rotor magnet 58 of south polarity arranged along the other half of the circumference of the rotor core. Similar to the previous embodiment, illustrated in FIG. 3, the rotor magnets 54 and 56 are spaced apart by 18 degrees. This predefined rotor magnet arrangement 54, generates sub-harmonic and super-harmonic magnetic rotating fields in the rotor's magnetic field.

Figure 6:
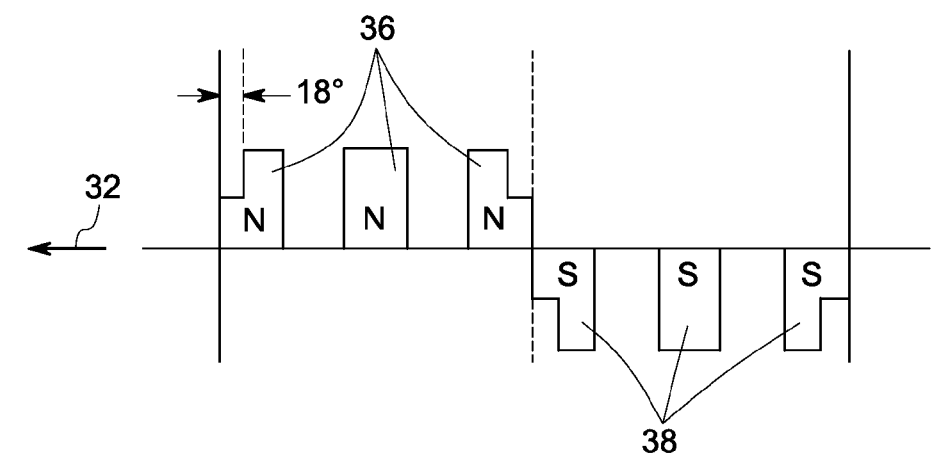
FIG. 6 is a diagrammatical representation of a ten-pole and a two-pole rotor magnet arrangement in accordance with an exemplary embodiment of the present invention.

FIG. 6 is a diagrammatical representation of the predefined arrangement of the rotor magnets 32 in accordance with an exemplary embodiment of the present invention. In the illustrated embodiment, the predefined arrangement of rotor magnets 32 is a combination of a ten-pole and two-pole rotor magnet arrangement. The predefined arrangement of the rotor magnets 32 include rotor magnets of one polarity 36 arranged along one half of the circumference of the rotor core and the rotor magnets of opposite polarity 38 arranged along the other half of the circumference. This predefined arrangement also includes a spacing of 18 degrees between the mutually adjacent rotor magnets 32. In the illustrated embodiment, the rotor magnets of north polarity 36 are shown arranged with 18 degrees space between each other. Further, the magnets of south polarity 38 are shown arranged with 18 degrees space between each other. In some embodiments, the spacing between the magnets may be in the range of 17 to 19 degrees. This predefined arrangement of magnets 32 generates the sub-harmonic and super-harmonic magnetic rotating fields in the rotor's magnetic field, which can cancel the sub-harmonic and super-harmonic magnetic rotating fields that exist in the stator magnetic field.

Figure 7:
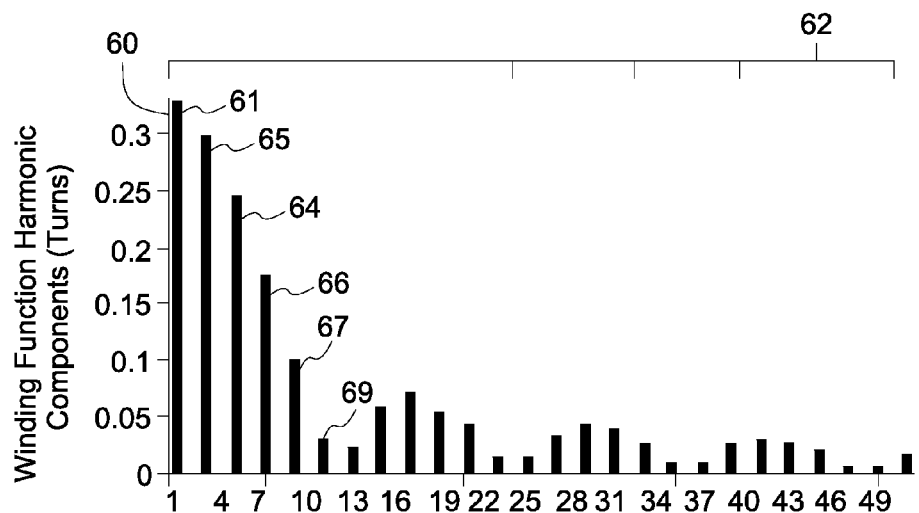
FIG. 7 is a graphical representation of the order of the harmonics that exist in the stator's magnetic field versus the winding functions of the plurality of stator windings in accordance with an exemplary embodiment of the present invention.

FIG. 7 is a graphical representation of a harmonic spectrum 60 of the winding functions of a permanent magnet machine. The x-axis represents the order of the harmonics that exist in the stator's magnetic field and the y-axis represents the winding functions of the plurality of stator windings. In the illustrated embodiment, the first, third, fifth, seventh, ninth and eleventh order harmonics, 61, 65, 64, 66, 67, 69 are depicted as the predominant harmonics 62 in the stator's magnetic field. In the illustrated embodiment, the permanent magnet machine is a ten-pole twelve-slot machine that operates at the seventh order harmonic 66, when the plurality of stator windings are excited with a polyphase current and a magnetic field is generated around the stator.

In such an embodiment, the fifth harmonic 64 becomes the synchronous torque producing component. The first and third order harmonics 61 and 65 are termed as sub-harmonics and the seventh, ninth, eleventh order harmonics, 66, 67 and 69 are termed as super-harmonics. In such a permanent magnet machine, the eleventh order harmonic 69 has an aiding effect on the torque produced in the permanent magnet machine and the first, seventh, and ninth order harmonics 61, 66, 67 have opposing effects on the torque produced in the permanent magnet machine. It can be noted from the graph that the fifth order sub-harmonic 64 is of a larger magnitude compared to the fundamental seventh harmonic 66, of which the former is the synchronous torque producing component. In conventional machines, this fifth order sub-harmonic 64 generates magnetic rotating fields that are not in synchronism with the rotor magnetic field, when the plurality of stator windings are excited by a polyphase electric current, thus causing vibrational and electromagnetic losses in the permanent magnet machine. As illustrated in in FIG. 7, the stator magnetic field generally follows a sinusoidal wave pattern 62. In conventional machines, the distribution of the stator coils or the geometrical effect of the windings in the stator slots deforms the distribution of the magnetic field in the air gap between the rotor and the stator, creating sub-harmonic and super-harmonic magnetic rotating fields that are not in synchronism with the rotor's magnetic field. These sub-harmonic and super-harmonic magnetic rotating fields cause vibrational and electromagnetic losses in the permanent magnet machine.

In accordance with the embodiments of the present invention, the torque retarding effects of the sub-harmonic and super-harmonic magnetic rotating fields associated with stator's magnetic field can be eliminated by introducing sub-harmonic and super-harmonic magnetic rotating fields of similar magnitude in the rotor's magnetic field. The arrangement of rotor magnets discussed herein with reference to FIGS. 1, 3, 5 and 6, for example, generates harmonic magnetic rotating fields in the rotor's magnetic field, similar in magnitude to the fifth order sub-harmonic 64 in the stator's magnetic field. These harmonic rotating fields in the rotor's magnetic field act to cancel torque retarding effects of the sub-harmonic and super-harmonic magnetic rotating fields that exist in the stator's 12 magnetic field, when the plurality of stator windings 24 are excited with a polyphase current.

Figure 8:
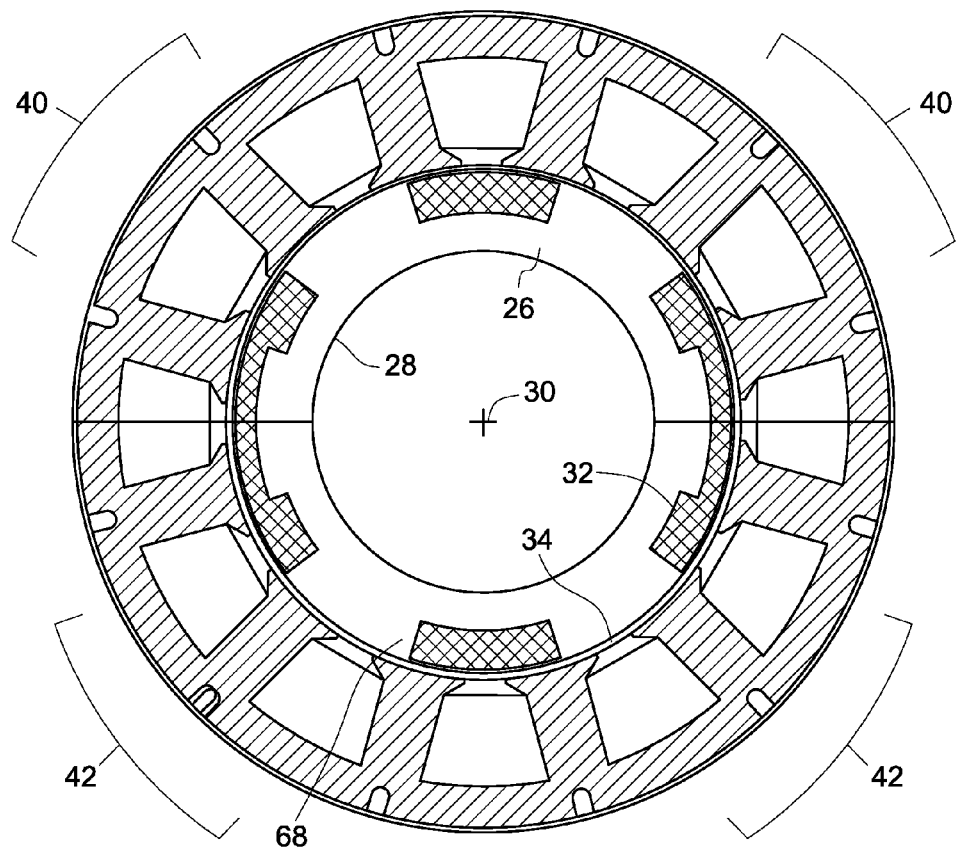
FIG. 8 is a diagrammatical representation of an exemplary rotor magnet arrangement in accordance with an exemplary embodiment of the present invention.

FIG. 8 illustrates a cross sectional view of the rotor 14 in accordance with another exemplary embodiment of the present invention. Similar to the previous embodiments, the rotor 14 is disposed within a cavity of the stator. In the illustrated embodiment, the rotor 14 includes a rotor core 26 having stacks of laminations 68. The rotor magnets 32 are disposed between or embedded inside the stacks of laminations 68 within the rotor core 26.

Figure 9:
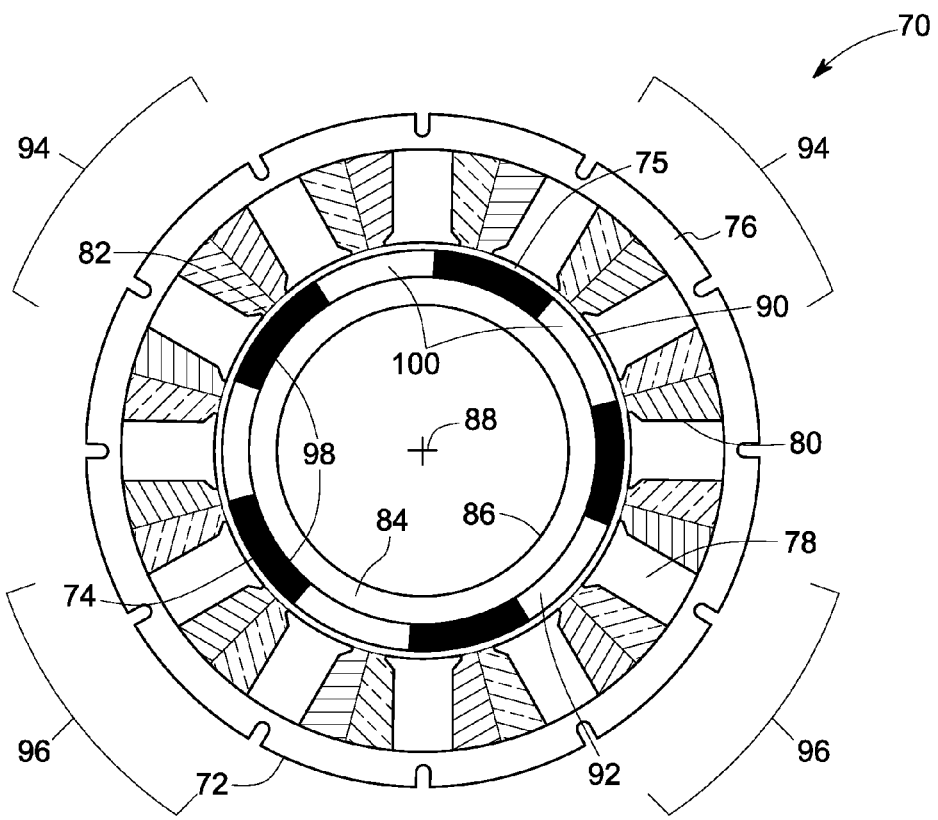
FIG. 9 is a cross-sectional view of a permanent magnet machine having an exemplary rotor magnet arrangement in accordance with an exemplary embodiment of the present invention.

FIG. 9 illustrates a cross-sectional view of a permanent magnet machine 70 in accordance with an exemplary embodiment of the present invention. The machine 70 includes a stator 72 and a rotor 74 disposed internally within a cavity 75 within the stator 72. The stator 72 includes a stator core 76 having stator teeth 78 and a plurality of stator slots 80. The stator core 76 further includes a plurality of stator windings 82 that are wound around the stator teeth 78. In the illustrated embodiment, the rotor 74 includes a rotor core 84 and a rotor shaft 86 which rotates about an axis 88. The rotor core 84 also includes a plurality of rotor magnets 90 arranged along a circumference 92 of the rotor core 84. One half portion extending between 0 to 180 degrees along the circumference 92 of the rotor core 84 is indicated by the reference numeral 94. The other half portion extending between 180 to 360 degrees along the circumference 92 of the rotor core 84 is indicated by the reference numeral 96. The rotor magnets 90 are configured to produce a magnetic field in an air gap between the stator 72 and the rotor 74.

In the illustrated embodiment, a magnetic field is generated in the air gap between the stator 72 and the rotor 74 due to the presence of the rotor magnets 90 having a predefined orientation profile that are arranged along the circumference 92 of the rotor core 84. In the illustrated embodiment, the rotor magnets 90 are arranged along the circumference 92 of the rotor core 84 such that the rotor magnets 90 of north polarity 98 and south polarity 100, are positioned alternately. The rotor magnets 90 are disposed along the circumference 92 of the rotor core so as to generally form a plurality of consecutive positive sinusoidal wave profiles (not shown). The predefined arrangement of the rotor magnets 90 along the circumference 92 of the rotor core 84, generates sub-harmonic and super-harmonic magnetic rotating fields in the rotor's magnetic field. These sub-harmonic and super-harmonic magnetic rotating fields that are generated in the rotor's magnetic field act to cancel the effect of similar harmonic magnetic rotating fields that exist in the stator's magnetic field during operation of the machine 70, resulting in generation of additional torque. This additional torque acts as an aiding torque and increases the efficiency and speed of the permanent magnet machine 70.

Figure 10:
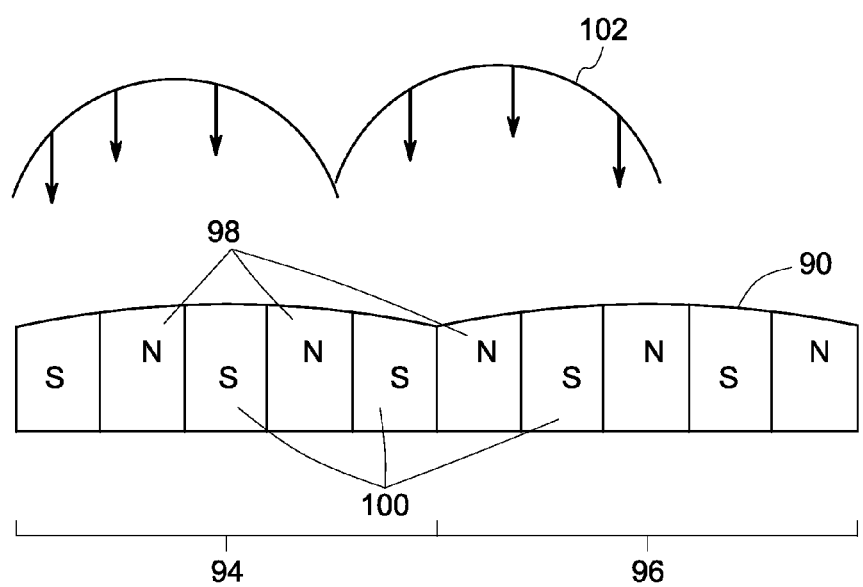
FIG. 10 is a diagrammatical representation of an exemplary rotor magnet arrangement in accordance with an embodiment of FIG. 9.

FIG. 10 is a cross-sectional view of the predefined arrangement of the rotor magnets 90 in accordance with the embodiment of FIG. 9. In the illustrated embodiment, the rotor magnets 90 are disposed along the circumference 92 of the rotor core so as to generally form a plurality of consecutive positive sinusoidal wave profiles 102. The rotor magnets 90 are shaped in manner such that the thickness of each magnet disposed along one portion 94 of the circumference 92 of the rotor core 84 is generally defined by a relation, $t=(a1+b1\times\sin\theta)$ where t is the thickness of the rotor magnet, a1 and b1 are constants, theta is a mechanical angle swept traversing the portion 94 of the circumference 92 of the rotor core 84 that ranges from 0 degrees to 180 degrees. The values of a1 and b1 are constants and depend on the permanent magnet machine 70 design parameters.

Further, the rotor magnets 90 are shaped in manner such that the thickness of each magnet disposed along the other portion 96 of the circumference 92 of the rotor core 84 is generally defined by a relation, $t=(a1-b1\times\sin\theta)$, where t is the thickness of the rotor magnet, a1 and b1 are constants, theta is a mechanical angle swept traversing the portion 96 of the circumference 92 of the rotor core 84 that ranges from 180 degrees to 360 degrees. Here again, the values of a1 and b1 are constants and depend on the permanent magnet machine 70 design parameters. The magnets of north polarity 98 and magnets of south polarity 100 are arranged alternately along the circumference 92 of the rotor core 84.

Figure 11:
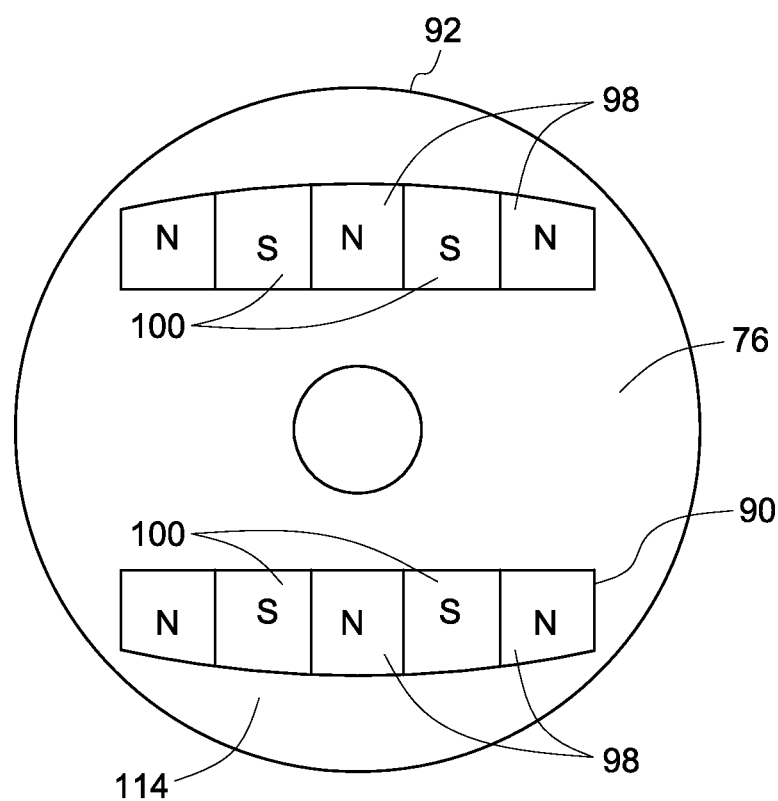
FIG. 11 is a diagrammatical representation of an exemplary rotor magnet arrangement in accordance with an exemplary embodiment of the present invention.

FIG. 11 illustrates a cross sectional view of the rotor 74 in accordance with another exemplary embodiment of the present invention. Similar to the previous embodiments, the rotor 74 is disposed within a cavity of the stator. In the illustrated embodiment, the rotor 74 includes a rotor core 76 having stacks of laminations 114. The rotor magnets 90 are disposed between or embedded inside the stacks of laminations 114 within the rotor core 76.

In the illustrated embodiment, the rotor magnets 90 are disposed between or embedded inside the stacks of laminations 114 within the rotor core 76 so as to generally form a plurality of consecutive positive sinusoidal wave profiles 102. The rotor magnets of north polarity 98 and south polarity 100 are disposed alternately between or embedded inside the stacks of laminations 114 of the rotor core 76.

Figure 12:
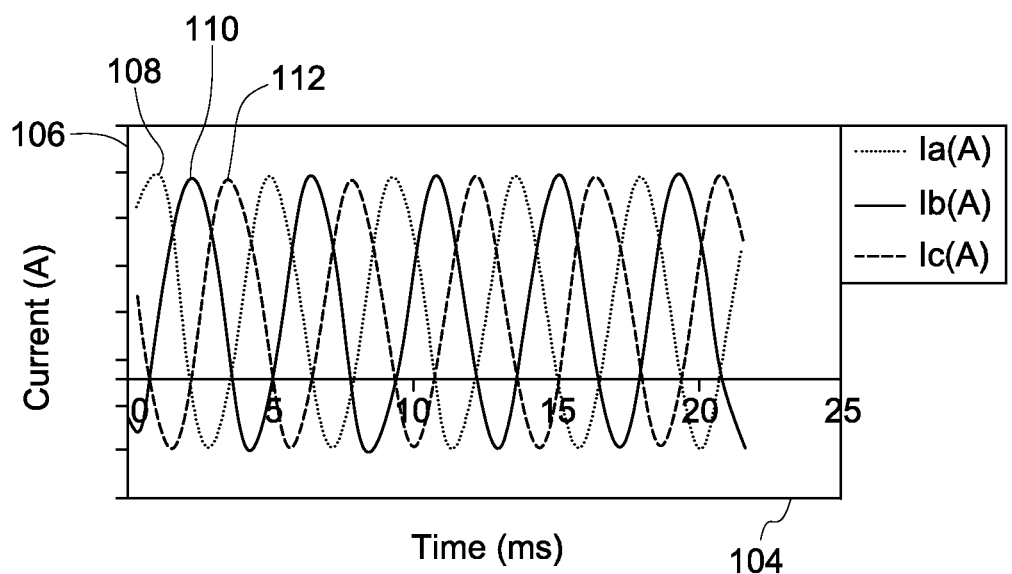
FIG. 12 is a graphical representation of a flow of a three-phase current with respect to time along the stator windings in accordance with an exemplary embodiment of the present invention.

FIG. 12 is a graphical representation of the flow of a three-phase current in the stator windings of a permanent magnet machine. The x-axis represents time 104 in milliseconds and the y-axis represents a current 106 in amperes having a particular frequency. The current 106 is a three-phase electric current having synchronous harmonic component. This current 106 is fed to the stator windings in a phase sequence ABC also referred to as a "first predetermined phase sequence", where A-phase 108 represents the first phase, B-phase 110 represents the second phase, and C-phase 112 represents the third phase of the current 106. In the illustrated embodiment, A-phase 108 leads B-phase 110 and B-phase leads C-phase 112, wherein phase angle between each of the phases is 120 degrees. When the stator windings are excited by such a current 106, synchronous magnetic rotating fields are generated in the stator magnetic field. As described previously, the synchronous magnetic rotating fields in the stator's magnetic field interact with similar magnetic rotating fields in the rotor's magnetic field. The interaction of stator and rotor synchronous magnetic rotating fields produces a synchronous torque in the permanent magnet machine.

Figure 13:
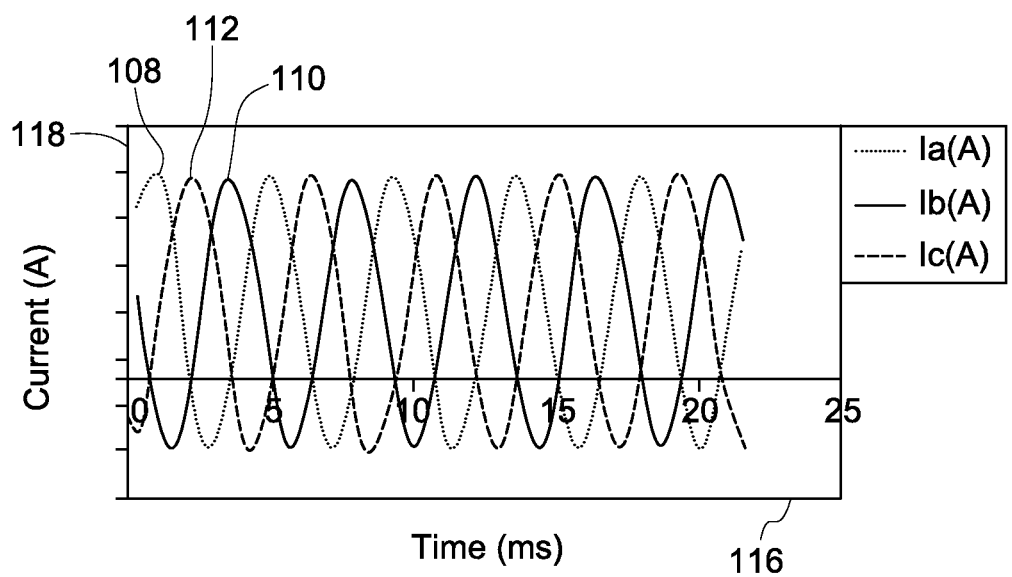
FIG. 13 is a graphical representation of a flow of a three-phase current with respect to time along the stator windings in accordance with an exemplary embodiment of the present invention.

FIG. 13 is a graphical representation of flow of a three-phase current in the stator windings of a permanent magnet machine. The x-axis represents time 116 in milliseconds and the y-axis represents a current 118 in amperes having a particular frequency. The current 118 is a three-phase electric current having a sub-harmonic component. This current 118 is fed to the stator windings in a phase sequence ACB, also referred to as a "second predetermined phase sequence", where A-phase 108 represents the first phase, C-phase 112 represents the second phase, and B-phase 110 represents the third phase of the current 118. In the illustrated embodiment, A-phase 108 leads C-phase 112, and C-phase 112 leads B-phase 110, wherein phase angle between each of the phases is 120 degrees. When the stator windings are excited by such a current 118, they produce sub-harmonic and super-harmonic magnetic rotating fields in the stator's magnetic field. As described previously, these sub-harmonic and super-harmonic magnetic rotating fields in the stator's magnetic field interact with similar sub-harmonic and super-harmonic magnetic rotating fields in the rotor's magnetic field that are produced in the rotor due to the predefined orientation profile of the rotor magnets, as described in earlier embodiments. The interaction of stator and rotor sub-harmonic and super-harmonic rotating fields produces an additional aiding torque in the permanent magnet machine.

According to another embodiment, the super positioning of both the currents 106 and 118, illustrated in FIG. 12 and FIG. 13 enables both synchronous harmonic component and sub-harmonic component to be included into the polyphase current that is injected into the stator windings of a permanent magnet machine. It should be noted herein that the term "super positioning" refers to the addition of the two currents 106 and 118. The phase sequencing between both the currents 106 and 118 ensures that the torques created by both these currents are not opposing each other but are acting in directions that are complementary to one another. The injection of such a current including both synchronous harmonic and sub-harmonic components generates both synchronous and harmonic magnetic rotating fields in the stator magnetic field. The interaction of stator synchronous and harmonic magnetic rotating fields with the rotor synchronous and harmonic magnetic rotating fields, as described in the previous embodiments, produces a synchronous torque and an additional aiding torque in a permanent magnet machine. This additional torque acts as an aiding torque and increases the total efficiency and speed of the permanent magnet machine.

Referring to FIGS. 12 and 13, each of the currents 106 and 118 injected into the stator windings of the permanent magnet machine include two phase sequences, one being ABC and the other being ACB. In the first predetermined phase sequence ABC, A-phase 108 leads B-phase 110, and B-phase leads C-phase 112, wherein phase angle between each of the phases is 120. Similarly, in the second predetermined phase sequence ACB, A-phase 108 leads C-phase 112, and C-phase 112 leads B-phase 110, wherein phase angle between each of the phases is 120 degrees.

For the first predetermined phase sequence ABC, the phase current $A_1$ in phase-A 108 of the current 106, is represented by the equation $A_1=I_1 \times \sin(2\pi \times f_1+\theta_1)$, where $I_1$ is the magnitude of the synchronous component of the current $A_1$ injected into the stator winding, $f_1$ is the frequency of the synchronous component of current $A_1$, and $\theta_1$ is the phase angle of the synchronous component of the current $A_1$ injected into the stator winding. For the second predetermined phase sequence ABC, the phase current $A_2$ in phase-A 108 of the current 118 is represented by the equation $A_2=I_2 \times \sin(2\pi \times f_2+\theta_2)$, where $I_2$ is the magnitude of the sub-harmonic component of the current $A_2$ injected into the stator winding, $f_2$ is the frequency of sub-harmonic component of the current $A_2$, and $\theta_2$ is the phase angle of the sub-harmonic component of the current $A_2$ injected into the stator winding. The total current injected the winding is the sum of the two phase currents i.e. $A_1+A_2$.

Similarly, for the first predetermined phase sequence ABC, the phase current $B_1$ of the current 106 in phase-B 110 is represented by the equation $B_1=I_1 \times \sin(2\pi \times f_1+\theta_1-2\pi/3)$, where $I_1$ is the magnitude of the synchronous component of the current $B_1$ injected into the stator winding, $f_1$ is the frequency of the synchronous component of current $B_1$, and $\theta_1$ is the phase angle of the synchronous component of the current $B_1$ injected into the stator winding. For the second predetermined phase sequence ACB, the phase current $B_2$ of the current 118 in phase-B 110 is represented by the equation $B_2=I_2 \times \sin(2\pi \times f_2+\theta_2-2\pi/3)$, where $I_2$ is the magnitude of the sub-harmonic component of the current $B_2$ injected into the stator winding, $f_2$ is the frequency of sub-harmonic component of the current $B_2$, and $\theta_2$ is the phase angle of the sub-harmonic component of the current $B_2$ injected into the stator winding. The total current injected in the winding is the sum of the two phase currents i.e. $B_1+B_2$.

Similarly, for the first predetermined phase sequence ABC, the phase current $C_1$ of the current 106 in phase-C 112 is represented by the equation $C_1=I_1 \times \sin(2\pi \times f_1+\theta_1+2\pi/3)$, where $I_1$ is the magnitude of the synchronous component of the current $C_1$ injected into the stator winding, $f_1$ is the frequency of the synchronous component of current $C_1$, and $\theta_1$ is the phase angle of the synchronous component of the current $C_1$ injected into the stator winding. For the second predetermined phase sequence ACB, the phase current $C_2$ of the current 118 in phase-C 112 is represented by the equation $C_2=I_2 \times \sin(2\pi \times f_2+\theta_2+2\pi/3)$, where $I_2$ is the magnitude of the sub-harmonic component of the current $C_2$ injected into the stator winding, $f_2$ is the frequency of sub-harmonic component of the current $C_2$, and $\theta_2$ is the phase angle of the sub-harmonic component of the current $C_2$ injected into the stator winding. The total current injected in the winding is the sum of the two phase currents i.e. $C_1+C_2$.

The super-positioning of both the currents 106 and 118 and the phase sequencing between phase currents $A_1$, $B_1$, $C_1$ of current 106 and the phase currents $A_2$, $B_2$, $C_2$ of current 118 ensures that both the currents 106, 118 are not opposing each other but are acting in directions that are complementary to one another. The injection of currents 106, 118 having both synchronous harmonic and sub-harmonic components generates both synchronous and harmonic magnetic rotating fields in the stator magnetic field. The interaction of stator synchronous and harmonic magnetic rotating fields with the rotor synchronous and harmonic magnetic rotating fields, as described in the previous embodiments, produces a synchronous torque and an additional aiding torque in a permanent magnet machine. This additional torque acts as an aiding torque and increases the total efficiency and speed of the permanent magnet machine.

Advantageously, the various embodiments of the invention eliminate the losses that naturally occur in fractional slot concentrated winding based permanent magnet machines. Additionally, the loss producing sub-harmonic rotating fields in the stator magnetic field are made to interact with sub-harmonic rotating fields of the rotor to produce additional torque to the permanent magnet machine. This additional torque allows for the permanent magnet machine to be operated efficiently at high speeds with no losses. The various embodiments of this invention allow the permanent magnet machine to operate with improved power density and efficiency.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An apparatus comprising:
a stator comprising a stator core, stator teeth and a plurality of stator windings coupled to the stator core; and
a rotor disposed within the stator, the rotor comprising a rotor core and a plurality of rotor magnets coupled to the rotor core, wherein the plurality of rotor magnets are configured to have consecutive positive sinusoidal wave shaped profiles that are permanently disposed along the circumference of the rotor core, and further
wherein the plurality of rotor magnets have a predefined orientation profile such that when a polyphase electric current including a synchronous harmonic component and a sub-harmonic component is supplied to the plurality of stator windings, the stator generates stator sub-harmonic and super-harmonic magnetic rotating fields, and the rotor rotation generates rotor sub-harmonic and super-harmonic magnetic rotating fields, wherein the stator sub-harmonic and super-harmonic magnetic rotating fields and the rotor sub-harmonic and super-harmonic magnetic rotating fields interact with each other to induce an aiding torque on the rotor.

2. The apparatus of claim 1, wherein the stator generates stator synchronous magnetic rotating fields and the rotor generates rotor synchronous magnetic rotating fields when the electric current is supplied to the plurality of stator windings, wherein the stator synchronous magnetic rotating fields and the rotor synchronous magnetic rotating fields interact with each other to produce a synchronous torque on the rotor, wherein the aiding torque on the rotor is produced in addition to the synchronous torque.

3. The apparatus of claim 1, wherein the apparatus comprises a fractional slot concentrated permanent magnet machine; wherein the plurality of stator windings comprises a plurality of stator coils; wherein each stator coil is wound around a corresponding stator tooth among the stator teeth.

4. The apparatus of claim 1, wherein the predefined orientation comprises one set of rotor magnets of one polarity arranged along one half of an outer circumference of the rotor core and another set of rotor magnets of an opposite polarity arranged along another half of the circumference of the rotor core, wherein the plurality of rotor magnets are spaced apart by an angle in the range of 17-19 degrees from each other.

5. The apparatus of claim 4, wherein the one half of the outer circumference extends from an angle of 0 degrees to 180 degrees along the outer circumference of the rotor core and the other half of the circumference extends from 180 degrees to 360 degrees along the outer circumference of the rotor core.

6. The apparatus of claim 1 wherein the rotor core includes a plurality of rotor laminations, wherein the plurality of rotor magnets are embedded inside the plurality of rotor laminations.

7. The apparatus of claim 1, wherein the predefined orientation comprises the plurality of rotor magnets disposed along an outer circumference of the rotor core so as to generally form consecutive positive sinusoidal wave profiles along the outer circumference of the rotor core.

8. The apparatus of claim 7, wherein the plurality of rotor magnets comprises a set of magnets of south polarity and another set of magnets of north polarity, wherein the set of magnets of south polarity are disposed alternately with the other set of magnets of north polarity along the circumference of the rotor core.

9. The apparatus of claim 7, wherein a thickness of each magnet disposed along one half of the circumference of the rotor core is generally defined by a relation $t=(a1+b1\times\sin\theta)$, where t is the thickness of the rotor magnet, a1 and b1 are constants, theta is a mechanical angle swept traversing the circumference of the rotor core and ranges from 0 degrees to 180 degrees.

10. The apparatus of claim 9, wherein a thickness of each magnet disposed along another half of the circumference of the rotor core is generally defined by a relation $t=(a1-b1\times\sin\theta)$, where theta ranges from 180 degrees to 360 degrees.

11. The apparatus of claim 1, wherein the rotor core includes a plurality of rotor laminations; wherein the predefined orientation comprises a plurality of rotor magnets disposed within the plurality of rotor laminations so as to generally form consecutive positive sinusoidal wave profiles within the rotor laminations.

12. An apparatus comprising:
a stator comprising a stator core, stator teeth and a plurality of stator windings coupled to the stator core; and
a rotor disposed within the stator, the rotor comprising a rotor core and a plurality of rotor magnets disposed along a circumference of the rotor core, wherein the plurality of rotor magnets are configured to have consecutive positive sinusoidal wave shaped profiles that are permanently disposed along the circumference of the rotor core, and further
wherein the plurality of rotor magnets comprises one set of rotor magnets of one polarity arranged along one half of the circumference of the rotor core and another set of rotor magnets of an opposite polarity arranged along another half of the circumference of the rotor core, wherein any two adjacent rotor magnets are spaced apart from each other by a radial angle along the circumference of the rotor core in the range of 17-19 degrees.

13. The apparatus of claim 12, wherein the circumference comprises an outer circumference of the rotor core.

14. The apparatus of claim 13, wherein the one half of the outer circumference extends from an angle of 0 degrees to 180 degrees along the outer circumference of the rotor core, and the other half of the outer circumference extends from 180 degrees to 360 degrees along the outer circumference of the rotor core.

15. An apparatus comprising:
a stator comprising a stator core, stator teeth and a plurality of stator windings coupled to the stator core;
a rotor disposed within the stator, the rotor comprising a rotor core and a plurality of rotor magnets disposed along a circumference of the rotor core,
wherein the plurality of rotor magnets are configured to have consecutive positive sinusoidal wave shaped profiles that are permanently disposed along the circumference of the rotor core.

16. The apparatus of claim 15, wherein, the circumference comprises an outer circumference of the rotor core.

17. The apparatus of claim 16, wherein the plurality of rotor magnets comprises a set of magnets of south polarity and another set of magnets of north polarity, wherein the set of magnets of south polarity are disposed alternately with the other set of magnets of north polarity along the outer circumference of the rotor core.

18. The apparatus of claim 16, wherein a thickness of each magnet disposed along the outer circumference of the rotor core is generally defined by a relation $t=(a1+b1\times\sin\theta)$, where t is the thickness of the rotor magnet, a1 and b1 are constants, theta is a mechanical angle swept traversing the circumference of the rotor core and ranges from 0 degrees to 180 degrees.

19. The apparatus of claim 16, wherein a thickness of each magnet disposed along the outer circumference of the rotor core is generally defined by a relation, $t=(a1-b1\times\sin\theta)$, where theta ranges from 180 degrees to 360 degrees.

* * * * *